United States Patent [19]

Layer et al.

[11] 4,355,148

[45] Oct. 19, 1982

[54] NORBORNENE POLYMERS CONTAINING BOUND PHENOLIC ANTIOXIDANT

[75] Inventors: Robert W. Layer, Cuyahoga Falls; Linwood P. Tenney, Hudson, both of Ohio

[73] Assignee: The B. F. Goodrich Company, Akron, Ohio

[21] Appl. No.: 188,397

[22] Filed: Sep. 18, 1980

[51] Int. Cl.[3] .................... C08F 232/00; C08F 234/00

[52] U.S. Cl. .................................... 526/281; 526/169; 526/282

[58] Field of Search ........................ 526/281, 283, 282

[56] References Cited

U.S. PATENT DOCUMENTS

| | | | |
|---|---|---|---|
| 3,962,187 | 6/1976 | Kline | 526/313 |
| 3,974,092 | 8/1976 | Streck | 526/313 X |
| 4,010,140 | 3/1977 | Bullard | 526/283 X |
| 4,017,669 | 4/1977 | Collette | 526/169 |
| 4,022,954 | 5/1977 | Kurosawa | 526/281 X |
| 4,129,557 | 12/1978 | Kudo | 526/283 |

*Primary Examiner*—C. A. Henderson
*Attorney, Agent, or Firm*—George A. Kap

[57] ABSTRACT

A polymeric composition of matter formed by ring opening polymerization using a metathesis catalyst comprising bound antioxidant which is a reaction product of a norbornene-type monomer and a norbornenyl phenolic antioxidant.

5 Claims, No Drawings

NORBORNENE POLYMERS CONTAINING BOUND PHENOLIC ANTIOXIDANT

BACKGROUND OF THE INVENTION

Degradation of polymeric materials can be caused by exposure to light, heat, and/or air. Such degradation is usually manifested by either a partial or total loss of structural integrity, changes in light transmission properties, changes in color, loss or reduction in flexibility and/or resiliency, or any combination of the above phenomena. Those attempting to avoid polymer degradation have generally selected from among three possible approaches: elimination or reduction of the degradative forces, isolation of the sensitive polymer material from the degradative forces, or modification of the polymer composition to enhance its resistance to the degradative forces. The latter approach is preferable since it does not require elaborate engineering or structural changes in the polymer environment.

The art of stabilizing polymeric materials is both complex and unpredictable. Ordinarily, the stabilizing agent is physically combined with the polymer thereby prolonging its useful life in the hostile degradative environment. In such cases, the stabilizing agent is generally free to slowly migrate within the composition and to the surface thereof. This presents a problem where the polymer is contacted by fluids which can extract the stabilizing agent. Furthermore, some stabilizing agents are heat sensitive and can change from a solid to a vapor at relatively low temperatures. Exposure of compositions containing such heat sensitive stabilizing agents will result in vaporization of the stabilizer and its eventual diffusion from the polymer. Whether the stabilizer is lost by fluid extraction or vaporization, or by any other means for that matter, the end result is that the polymer will again become vulnerable to attack by degradative forces.

SUMMARY OF THE INVENTION

This invention relates to stabilization of norbornene polymeric materials by polymerizing norbornene monomers with norbornenyl phenolic antioxidants by ring opening polymerization in order to introduce bound antioxidant into the norbornene polymeric material.

DETAILED DESCRIPTION OF THE INVENTION

In order to reduce the effects of degradative forces on norbornene polymeric materials due to exposure to air at ambient and elevated temperature, it is proposed to polymerize a norbornene monomer or a mixture thereof in the presence of a norbornenyl phenolic antioxidant. Relative proportion of reactants can vary from 0.05 to 10 parts by weight, preferably 0.5 to 2 parts of the norbornenyl phenolic antioxidant per 100 parts by weight of the norbornene monomers. The polymerization can be carried out with the aid of ring-opening metathesis catalysts, as is described more fully hereinafter.

The class of norbornene polymeric materials referred to herein includes homopolymers and polymers of two or more of the monomers that contain the norbornene moiety, defined structurally as follows:

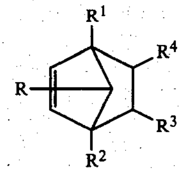

Pursuant to this definition, norbornene polymeric materials include homopolymers, copolymers, terpolymers, and generally polymers of substituted and unsubstituted monomers selected from norbornenes, dicyclopentadienes, dihydrodicyclopentadienes, tetracyclododecenes, and symmetrical and unsymmetrical trimers and tetramers of cyclopentadiene. Norbornene polymeric materials can also have polymerized therein small amounts of non-norbornene monomers.

Norbornene or bicycloheptene-2 monomers, which are included within the scope of this invention, are defined as follows:

where each R, $R^1$, $R^2$, $R^3$, and $R^4$ can separately be hydrogen, alkyl or alkenyl group containing 1 to 20 carbon atoms, and where $R^3$ and $R^4$ can be joined to form an aryl group of 6 to 18 carbon atoms or a cycloalkyl or cycloolefin group of 5 to 6 carbon atoms. Preferably, R, $R^1$ and $R^2$ are hydrogens and $R^3$ and $R^4$ are individually selected from hydrogen and alkyl or alkenyl groups of 1 to 5 carbon atoms. The alkyl and alkenyl groups can be substituted with ester, nitrile, substituted and unsubstituted phenyl, and halogen groups. Examples of such norbornene monomers include 2-norbornene (where all Rs are hydrogens), 5-methyl-2-norbornene, 5,6-dimethyl-2-norbornene, 5-pentadecyl-2-norbornene, 5-ethyl-2-norbornene, 5-butyl-2-norbornene, 5-vinyl-2-norbornene, 5-propenyl-2-norbornene, and 5-butenyl-2-norbornene.

Dicyclopentadiene and dihydrodicyclopentadiene monomers have the following structural formulas:

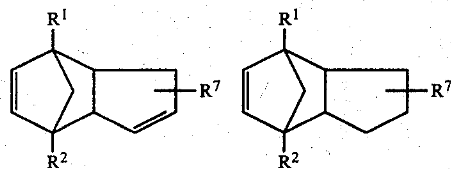

where $R^1$ and $R^2$ are defined as above and there can be up to three $R^7$ groups which are defined in the same way as $R^1$. Tetracyclododecene monomers and symmetrical trimers of cyclopentadiene have the following respective structural formulas:

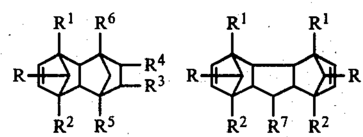

where R, $R^1$, $R^2$, $R^3$, $R^4$, and $R^7$ are defined as above whereas $R^5$ and $R^6$ are individually selected from hydrogen, alkyl and alkenyl groups of 1 to 20 carbon atoms, preferably $R^5$ and $R^6$ are hydrogens.

Other monomers can also be polymerized with the norbornene monomers. Such other monomers include cyclopentadiene and other monocyclic mono and diolefins. Amount of such monomers in the polymerization recipe can vary from 1 to 50 parts per 100 parts of the norbornene monomers.

Polymerization of the norbornene-type monomers is conducted in the presence of a catalyst mixture which comprises (a) at least one organoaluminum halide and (b) at least one tungsten or molybdenum salt or a mixture of these salts. The organoaluminum halide which is utilized in the catalyst mixture can be either a dihalide of the formula $RAlX_2$ or aluminum sesquihalide of the formula $R_3Al_2X_3$ where R is an alkyl radical containing from 1 to about 12 carbon atoms, preferably about 2 to 4 carbon atoms, and X is a halogen.

The organoaluminum halides or mixtures of organoaluminum halides are employed at a level of from about 0.01 to about 20 or more millimoles per mole of monomer, and the molybdenum or tungsten salts are employed at a level of from about 0.001 to about 1 millimole per mole of monomer mixture. The molar ratio of organoaluminum halide to molybdenum and/or tungsten salt(s) is not critical and may range from about 200:1 or more to about 1:10 although a ratio within the range of from 4:1 to about 2:1 is preferred.

In a preferred embodiment, the organoaluminum halide and the salts of tungsten and molybdenum are dissolved in a solvent prior to incorporation into the monomer mixture. The addition of the catalyst components as solutions facilitates the handling thereof and also results in a brief induction period after addition to the monomer mixture which permits the addition and complete mixing of all of the components of the reaction mixture before substantial polymerization begins. The result is a more uniform process control, and ultimately, a reduced gel formation. Generally, the organoaluminum halide will be predissolved in the same hydrocarbon solvent as used for conducting the polymerization reaction. Thus, preferred solvents for the organoaluminum halides are the aromatic solvents such as benzene, toluene, etc.

The preferred solvents for the molybdenum and tungsten compounds comprise at least one alkylester of a saturated carboxylic or dicarboxylic acid. The concentration of the salts in the ester solvents may vary from as low as about 0.1 molar and up to about 3 molar. Examples of the preferred ester solvents include methyl formate, ethyl formate, methyl chloroformate, ethyl chloroformate, methyl acetate, ethyl acetate, n-propyl acetate, ethyl propionate and dimethyl malonate. Excellent results have been obtained with ethyl acetate.

A polymerization activator may be used but is not generally required. Excellent activation is obtained by using air or a peroxide or hydroperoxide, and especially the organic peroxide such as benzoyl peroxide. The activator may be added at any point in the charging procedure, but is more preferably added last.

The molecular weight of the copolymers prepared in accordance with the process of the invention can be controlled or modified when the reaction is conducted in the presence of at least one non-conjugated acyclic olefin containing from two to about 12 carbon atoms and having at least one hydrogen on each double-bonded carbon atom. Examples of suitable compounds include the 1-olefins such as 1-butene, 3-methyl-1-butene, 1-hexene; the 2-olefins such as 2-pentene, 4-methyl-2-pentene; 3-olefins such as 5-ethyl-3-octene; non-conjugated diolefins such as 1,6-hexadiene; and non-conjugated triolefins such as 1,4-octatriene. The preferred non-conjugated acyclic olefins are the 1-olefins of the type described above. It is believed that these olefins provide an easily workable and generally hydrocarbon-soluble polymer.

The non-conjugated acyclic olefin or a mixture of such olefins is used in a molar ratio of olefin to total monomer charge of from about 0.0001:1 to about 0.3:1. The non-conjugated acyclic olefins can be charged directly or in solution at any point in the charging procedure, but it is preferred that the olefins be charged along with the monomers.

The polymerization reaction can be performed as a batch or continuous process. The reaction mixture in the reaction vessel may be cooled or heated to the polymerization temperature at the start of the additions or at any point during the addition of the various reactants. Polymerization temperatures of from about −80° C. to about 100° C. are utilized although the reaction generally proceeds satisfactorily at about room temperature.

If desired, the polymerization reaction can be shortstopped by the addition of alcohols, amines or carboxylic acids such as ethanol, water, diethylamine, acetic acid, etc.

At the conclusion of the polymerization reaction, the copolymer product can be isolated by any of the methods known in the art, such as by direct drying under reduced pressure, by precipitation or by steam or by stripping with hot water. The polymer is recovered and may be washed further and then dried. The copolymers of the invention are substantially gel-free, and generally are rigid plastics or glass-like at room temperature. When extended with an oil, the copolymers behave as elastomers.

The norbornenyl phenolic antioxidants are defined by the following structural formula:

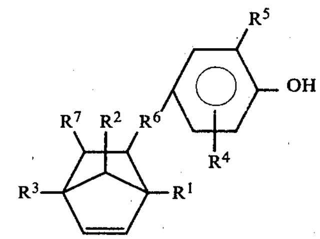

where $R^1$, $R^2$, and $R^3$ are individually selected from hydrogen and alkyl groups of 1 to 3 carbon atoms; $R^4$ is selected from hydrogen, alkyl groups containing 1 to 12 carbon atoms, and substituted and unsubstituted alicyclic groups of 4 to 8 carbon atoms; $R^5$ is selected from alkyl groups containing 1 to 6 carbon atoms, and substituted and unsubstituted alicyclic groups of 4 to 8 carbon atoms; $R^6$ is selected from alkylene and alkenylene groups containing 1 to 8 carbon atoms; and $R^7$ is selected from hydrogen and alkyl and alkenyl groups containing 1 to 8 carbon atoms. In a preferred embodiment, $R^1$, $R^2$ and $R^3$ are individually selected from hydrogen and methyl groups; $R^4$ is an alkyl group of 1 to 6 carbon atoms located at the open ortho position to the hydroxyl group; $R^5$ is an alkyl group of 1 to 6 carbon atoms; $R^6$ is selected from alkylene and alkenylene groups containing 1 to 4 carbon atoms; and $R^7$ is an alkyl group of 1 to 4 carbon atoms.

Preparation of norbornenyl phenolics is characterized by the reaction of substituted and unsubstituted cyclopentadienes with phenolic compounds, preferably hindered phenolic compounds wherein one or both of the ortho positions to the hydroxyl group are substituted and the para position contains a dienophile suitable for Diels-Alder reaction with the cyclopentadienes. Suitable cyclopentadienes contain up to three substituent groups, preferably none to one, individually selected from alkyl radicals of 1 to 3 carbon atoms. The phenolic compounds also contain up to three substituent groups individually selected from alkyl and alkenyl groups of 1 to 12 carbon atoms, and substituted and unsubstituted alicyclic groups of 4 to 8 carbon atoms. In a preferred embodiment, one of the substituent groups is located in the ortho position relative to the hydroxyl group and the substituents are selected from alkyl and alkenyl groups of 1 to 6 carbon atoms; more preferably, two alkyl groups of 1 to 6 carbon atoms are located at both of the ortho sites to the hydroxyl group and one alkenyl group containing one unsaturated bond and 1 to 6 carbon atoms is located para to the hydroxyl group.

The preferred phenolic compounds are prepared by reacting an alkylene halide with a substituted phenol in order to introduce the unsaturated group onto the phenyl group in the para position. This reaction is carried out under a blanket of nitrogen in presence of a solvent, such as dimethyl formamide or dimethyl sulfoxide, and an alkali metal alkoxide catalyst, such as sodium methoxide. Specific examples of alkylene halides include allyl halides such as allyl bromide and allyl chloride, 6-chloro-1-hexene, 4-bromo-1-octene, and others, all of which can contain lower alkyl substituents on the carbon chains. Suitable examples of substituted phenols which can be used in the reaction with alkylene halides to produce phenolic compounds include 2,6-di-t-butylphenol, 2-t-butyl-6-methylphenol, 2-octyl-6-t-butylphenol, 2-t-butyl-6-cyclohexylphenol, 2-hexyl-6-cyclohexylphenol, and 2-t-pentyl-6-methylcyclohexylphenols.

Reaction products of norbornene monomers and norbornenyl phenolic antioxidants are prepared by adding to a reaction vessel a norbornene monomer, or a mixture thereof, a norbornenyl phenolic antioxidant, or a mixture thereof, and a molecular weight modifier, such as 1-hexene. These reactants are polymerized in the presence of suitable catalysts. This polymerization procedure is the same as that for polymerizing the norbornene monomers, which is described above.

This invention will now be illustrated by specific examples which are presented for the purpose of clarifying the disclosure of the herein claimed invention and the examples herein are not to be construed as limiting in any way the scope of the appended claims.

EXAMPLE 1

This example demonstrates preparation of a norbornenyl phenolic antioxidant by initially reacting allyl bromode with di-t-butylphenol to obtain a first reaction product, i.e., 4-allyl-2,6-di-t-butylphenol. The second phase of the reaction involves the step of reacting the first reaction product with dicyclopentadiene to obtain a norbornenyl phenolic antioxidant.

The initial reaction was carried out by charging a one liter, 3-necked reaction with 11.8 g (0.218 mole) sodium methoxide and 200 ml of dry dimethyl formamide. The suspension was stirred at room temperature. A solution of 4.12 g (0.2 mole) of the substituted phenol in 100 ml of dry dimethyl formamide was then added to the reactor and the contents thereof were stirred for one hour. Subsequently, 25 g (0.21 mole) of allyl bromide was added over a period of 15 minutes with vigorous agitation, allowing the reaction to exotherm freely. The exotherm reached 41° C. during addition of allyl bromide but dropped soon after all of the allyl bromide was added. A sample was analyzed by vapor phase chromatography which showed 62% product formation. The reactor was heated and held at 50° C. for one hour and then was allowed to cool down and remain overnight at room temperature. In the morning, water was added to the reactor with stirring, followed by toluene to extract the organic matter. The toluene layer was washed with water three times in a large separatory funnel and then dried over sodium sulfate. The liquid was filtered off with suction and then evaporated to yield a reddish oil which was distilled under high vacuum to yield the first reaction product, i.e., 4-allyl-2,6-di-t-butyl phenol.

The second phase of the reaction was undertaken by mixing 107 g (0.32 mole) of 4-allyl-2,6-di-t-butylphenol, i.e., the first reaction product, with 85 g (0.64 mole) of dicyclopentadiene and charging the mixture to a stainless steel high pressure reactor. Reaction temperature was maintained at about 240° C. for about 4 hours with pressure developing to about 50 psig. Under these conditions, dicyclopentadiene undergoes a retro Diels-Alder reaction to form cyclopentadiene. Samples were continuously taken for analysis. After about 4 hours of reaction time, contents of the reactor were transferred to a flask and distilled at under vacuum. The product distilled at 148° to 152° C. at 1.5 mm of vacuum and was of pale yellow color. The product was identified by NMR spectroscopy to be a norbornenyl phenolic, 5-(3,5-di-t-butyl-4-hydroxybenzyl)-2-norbornene; NMR ($CDCl_3$), δ1.43 (S, 18H, C-$CH_3$), 1.61–2.94 (M, 9H, C-H), 3.25 & 3.36 (D, 2H, Ar-$CH_2$), 4.99 (S, 1H, O-H), 6.96 (S, 2H, Ar-H); mass spectrum, m/e 312($M^+$).

EXAMPLE 2

This example illustrates preparation of a reaction product of this invention which was obtained by polymerizing norbornenyl phenolic of Example 1 with dicyclopentadiene and 5-methyl-2-norbornene by ring opening polymerization.

| | Samples | |
|---|---|---|
| Materials | 1 | 2 |
| toluene, dry | 50 ml | 50 ml |
| dicyclopentadiene, 90% purity d = 0.99158 | 4.3 ml | 4.3 ml |
| 5-methyl-2-norbornene 99% + purity d = 0.865 | 3.6 ml | 3.6 ml |
| 1-hexene solution | 2.0 ml | 2.0 ml |
| norbornenyl phenolic of Ex. 1 | None | 0.1 ml |
| diethyl aluminum iodide | 0.6 ml | 0.6 ml |
| molybdenum pentachloride | 0.75 ml | 0.75 ml |

Polymerizations were carried out by charging a reactor with toluene, dicyclopentadiene, methyl norbornene, 0.149 g of 1-hexene in toluene, and the catalysts to a clean, dry, nitrogen-purged glass bottle. Addition of these materials to the reactor was made with agitation. The 0.1 ml of the norbornenyl phenolic weighed 0.11 g. Diethyl aluminum iodide catalyst was added as a 0.25 molar solution in toluene whereas molybdenum pentachloride was an 0.05 molar solution in a 3.0 molar solution of ethyl acetate in toluene. Viscosities of the reaction mixtures increased with time which was accompanied by evolution of heat and development of a purple color. The reactions were allowed to proceed for one hour and then were short-stopped with 0.1 ml of ethanolamine and 0.3 ml of methanol. No other antioxidant was added. The reaction products were coagulated in a blender with an excess amount of Fotocol and then dried in an oven vacuum at 60° C. Amount of Sample 1 and Sample 2 reaction products recovered was 6.9 g and 6.95 g, respectively.

This experiment showed, inter alia, that the norbornenyl phenolic antioxidant did not kill the catalyst, as was expected.

EXAMPLE 3

This example is a scale-up of Example 2, using the same materials, with test data showing that the antioxidant is chemically bound in the polymeric reaction product and antioxidant efficacy of the polymeric reaction product.

| Materials | Samples 1 | 2 |
|---|---|---|
| toluene, dry | 500 ml | 500 ml |
| dicyclopentadiene | 43 ml | 43 ml |
| 5-methyl-2-norbornene | 36 ml | 36 ml |
| 1-hexene solution | 20 ml | 20 ml |
| norbornenyl phenolic of Ex. 1 | None | 0.61 ml |
| diethyl aluminum iodide | 6 ml | 6 ml |
| molybdenum pentachloride | 7.5 ml | 7.5 ml |

The reaction was conducted in the same manner as outlined in Example 2. The 0.61 ml of the norbornenyl phenolic weighed 0.67 g. The reaction was continued for one hour and was then short-stopped by addition of 1 ml of ethanolamine and 3 ml methanol. No other antioxidant was added. The reaction products were coagulated in a blender with an excess amount of Fotocol, filtered and then dried in an oven under vacuum at 60° C. Physical test results on the reaction product are given below:

| | Samples 1 | 2 |
|---|---|---|
| yield | 62.2 g | 63.7 g |
| DSV | 1.179 | 1.607 |
| % gel | 2.356 | 3.515 |
| near IR analysis | None | see expl. below |

Near IR analysis of Sample 2 showed considerable discrepancy. Upon coagulation from toluene, Sample 2 showed the presence of 0.3% bound norbornenyl phenolic antioxidant whereas repetition of this procedure later gave a figure of 0.72%. Better procedural control was indicated in the second analysis. In another attempt, Sample 2 was dissolved in cyclohexane in order to dissolve any unreacted or unbound norbornenyl phenolic antioxidant, and then coagulated with methanol and analyzed by near IR. This analysis gave a figure of 0.76% of the antioxidant. When the latter sample was dissolved in cyclohexane, the second time and again coagulated, amount of the bound norbornenyl phenolic antioxidant was only 0.22%. Since the 0.22% figure appeared to be suspect, the sample was dissolved in cyclohexane for the third time and again coagulated. This time amount of the bound antioxidant was 0.68%, which is in line with earlier findings. Theoretical amount of bound norbornenyl phenolic antioxidant is 0.66%, which futher corroborates the higher figures.

EXAMPLE 4

This example demonstrates preparation of a reaction product of norbornenyl phenolic of Example 1 and dicyclopentadiene, 5-methyl-2-norbornene and methyl tetracyclododecene with varying amounts of some of the materials.

All of the samples 1 to 5 were prepared with 500 ml of dry cyclohexane, 40.3 ml dicyclopentadiene of 89.9% purity in toluene, 20.3 ml methyl norbornene of 99%+purity, and 17.8 ml methyl tetracyclododecene of 96.8% purity. A 0.25 molar solution of diethyl aluminum iodide solution in toluene in amount of 6 ml and 7.5 ml of a solution of molybdenum pentachloride and ethyl acetate in toluene was used as a catalyst in the polymerization reactions. Relative molar amounts of molybdenum pentachloride and ethyl acetate were 0.05 and 3.0. Other materials were varied as indicated below:

| | Samples 1 | 2 | 3 | 4 | 5 |
|---|---|---|---|---|---|
| pure 1-hexene (ml) | 20 | 23 | 27 | 31 | 37 |
| norbornene phenolic of Ex. 1(g) | 0.075 | 0.188 | 0.375 | 0.75 | 1.5 |

Preparation procedure here was the same as in Example 2. The reactions appeared to proceed quickly with evolution of heat. There was also a rapid increase in viscosity and color change initially to purple and then to brown. The reaction was short-stopped after one hour with 1 ml of ethanolamine and 3 ml of methanol. No other antioxidant was added. The reaction products were coagulated with methanol in a blender, filtered and dried under vacuum in an oven at 60° C. Results obtained on the samples are presented below:

| | Samples 1 | 2 | 3 | 4 | 5 | Control |
|---|---|---|---|---|---|---|
| Yield, (g) | 76 | 75.2 | 74.7 | 75 | 76 | |
| DSV | 1.747 | 1.456 | 1.242 | 1.185 | 1.258 | 1.618 |
| % Gel | 7.05 | 3.43 | 2.40 | 2.63 | 9.12 | 3.35 |

EXAMPLE 5

Samples 1 to 5 of Example 4 were prepared for testing by casting a film thereof from a toluene solution by deposition on a Mylar sheet and evaporation of the toluene. The test films were removed from Mylar sheet, placed in an air oven maintained at 70° C. and the carbonyl region of the infrared spectrum at 1730 $cm^{-1}$ was monitored for oxidative failure. Thickness of the film was on the order of about 20 mils. Days to formation of a fair amount of carbonyl (C=O) is given in Table I, below:

TABLE I

| Sample No. | PHR AO Added | PHR AO Bound | Days to C = O Formation |
|---|---|---|---|
| Control | 0 | insoluble | 2 |
| 1 | 0.075 | insoluble | 3 |
| 2 | 0.188 | insoluble | 4 |

TABLE I-continued

| Sample No. | PHR AO Added | PHR AO Bound | Days to C = O Formation |
|---|---|---|---|
| 3 | 0.375 | 0.35 | 4 |
| 4 | 0.75 | 0.76 | 11 |
| 5 | 1.5 | 1.59 | 15 |
| AO2246 | 0.75 | | 5 |
| AO2246 | 1.5 | | 8 |

Although the analysis aspect of this work was hindered by insolubility problems when very low levels of antioxidants were used, the results were excellent when the normal levels of antioxidants were used. The data shows a direct correlation of antioxidant activity with antioxidant level. More importantly, at the 0.75 phr level, the bound antioxidant was found to protect the polymer better than the widely used, commercial antioxidant, AO 2246. This relationship is also observed at the 1.5 phr levels of AO 2246.

In order to determine the amount of antioxidant that was bound to the polymer, the polymers were purified from a cyclohexane solution by recoagulation with ethanol to remove any unreacted norbornenyl phenolic antioxidant and to remove toluene. Samples 1 and 2 were not sufficiently soluble in cyclohexane to be purified and could not be analyzed. Samples 3, 4 and 5 were analyzed as follows: an analytically weighed portion of approximately 0.4 grams was weighed into a 25 volumetric flask and filled to the mark with spectral grade cyclohexane. A 5 ml aliquot was diluted to 25 ml and the UV spectrum obtained. The absorbance at the absorption maxima of 275 mu was measured and, using Beer's law, compared with the absorbance of a known amount of the pure norbornenyl phenolic antioxidant to give the amount of norbornenyl phenolic antioxidant present in the polymer. These results are given in Table I, above in the column entitled "PHR AO Bound".

We claim:

1. A polymeric composition of matter comprising a reaction product obtained by ring opening polymerization using a metathesis catalyst of a norbornene-type monomer and 0.05 to 10 parts by weight per 100 parts of said norbornene-type monomers of a norbornenyl phenolic antioxidant defined as follows:

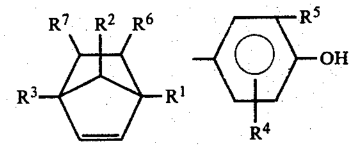

where $R^1$, $R^2$, and $R^3$ are individually selected from hydrogen and alkyl groups of 1 and 3 carbon atoms; $R^4$ is selected from hydrogen, alkyl groups containing 1 to 12 carbon atoms, and alicyclic groups of 4 to 8 carbon atoms; $R^5$ is selected from alkyl groups of 1 to 6 carbon atoms, and alicyclic groups of 4 to 8 carbon atoms; $R^6$ is selcted from alkylene and alkenylene groups containing 1 to 8 carbon atoms; and $R^7$ is selected from hydrogen, alkyl and alkenyl groups of 1 to 8 carbon atoms, amount of said norbornenyl phenolic being sufficient to improve antioxidant properties of said reaction product.

2. Composition of claim 1 wherein $R^1$, $R^2$ and $R^3$ are individually selected from hydrogen and methyl groups, $R^4$ is selected from alkyl groups of 1 to 6 carbon atoms, $R^5$ is selected from alkyl groups of 1 to 6 carbon atoms, $R^6$ is selected from alkylene and alkenylene groups of 1 to 4 carbon atoms, and $R^7$ is selected from alkyl groups of 1 to 4 carbon atoms.

3. Composition of claim 2 wherein said norbornene type monomers are selected from norbornenes, dicyclopentadienes, dihydrodicyclopentadienes, tetracyclododecenes and symmetrical and unsymmetrical trimers and tetramers of cyclopentadiene.

4. Composition of claim 3 wherein said norbornene-type monomers are selected from substituted and unsubstituted monomers, wherein said substituents are selected from ester, nitrile, phenyl, and halogen groups.

5. Composition of claim 2 wherein $R^4$ is in the open ortho position to the hydroxyl group.

* * * * *